United States Patent
Nielsen et al.

(10) Patent No.: US 12,228,107 B2
(45) Date of Patent: Feb. 18, 2025

(54) CORRECTING PITCH ANGLE

(71) Applicant: VESTAS WIND SYSTEMS A/S, Aarhus N (DK)

(72) Inventors: Johnny Nielsen, Svenstrup J (DK); Jens Van Schelve, Oporto (PT); Goncalo Lucas Marcos, Cascais (PT); Dan Hilton, Gjern (DK); Kristian Kiib, Skødstrup (DK)

(73) Assignee: VESTAS WIND SYSTEMS A/S, Aarhus N (DK)

(*) Notice: Subject to any disclaimer, the term of this patent is extended or adjusted under 35 U.S.C. 154(b) by 175 days.

(21) Appl. No.: 17/417,082

(22) PCT Filed: Dec. 3, 2019

(86) PCT No.: PCT/DK2019/050377
§ 371 (c)(1),
(2) Date: Jun. 21, 2021

(87) PCT Pub. No.: WO2020/125885
PCT Pub. Date: Jun. 25, 2020

(65) Prior Publication Data
US 2022/0074386 A1    Mar. 10, 2022

(30) Foreign Application Priority Data
Dec. 20, 2018 (DK) .......................... PA 2018 70838

(51) Int. Cl.
F03D 7/02    (2006.01)
(52) U.S. Cl.
CPC ........ *F03D 7/0224* (2013.01); *F05B 2260/70* (2013.01); *F05B 2270/328* (2013.01); *F05B 2270/331* (2013.01); *F05B 2270/802* (2013.01)

(58) Field of Classification Search
CPC ...... F03D 7/0224; F03D 7/0296; F03D 7/024; F05B 2260/70; F05B 2270/328; F05B 2270/331; F05B 2270/802; F05B 2260/84
See application file for complete search history.

(56) References Cited

U.S. PATENT DOCUMENTS 5,584,655 A * 12/1996 Deering ................ F03D 7/0252
416/41
9,459,179 B2 * 10/2016 Brenner ................ G01M 15/14
(Continued)

FOREIGN PATENT DOCUMENTS

CN    101878365 A    11/2010
CN    102112738 A    6/2011
(Continued)

OTHER PUBLICATIONS

Intellectual Property India, First Examination Report for Application 202117032323 dated Dec. 12, 2022.
(Continued)

*Primary Examiner* — Matthew T Largi
(74) *Attorney, Agent, or Firm* — Patterson + Sheridan, LLP

(57) ABSTRACT

A method of correcting a pitch angle deviation of a blade of a wind turbine is provided. First blade load measurements measured when the wind turbine was operating in a first operational mode are provided, and used to determine calibration parameters. Second blade load measurements measured when the wind turbine was operating in a second operational mode are provided, and the calibration parameters applied to determine calibrated blade load measurements. A pitch angle deviation of at least one blade of the turbine is estimated based on an identified difference between the calibrated blade load measurements, and a pitch angle is adjusted to correct for the pitch angle deviation.

17 Claims, 9 Drawing Sheets

(56) References Cited

U.S. PATENT DOCUMENTS

| | | | |
|---|---|---|---|
| 11,555,736 B2* | 1/2023 | Fischle | F03D 17/00 |
| 2007/0057517 A1* | 3/2007 | McNerney | F03D 7/042 |
| | | | 290/44 |
| 2008/0307853 A1* | 12/2008 | Siebers | G01P 21/025 |
| | | | 290/55 |
| 2009/0263246 A1* | 10/2009 | Bolz | F03D 17/00 |
| | | | 416/61 |
| 2010/0014969 A1* | 1/2010 | Wilson | F03D 7/024 |
| | | | 416/31 |
| 2011/0135474 A1* | 6/2011 | Thulke | G01L 1/2218 |
| | | | 416/61 |
| 2011/0158806 A1 | 6/2011 | Arms et al. | |
| 2011/0285129 A1* | 11/2011 | Li | F03D 7/042 |
| | | | 290/44 |
| 2012/0230820 A1* | 9/2012 | Frydendal | F03D 7/0204 |
| | | | 416/61 |
| 2013/0045098 A1* | 2/2013 | Taylor | F03D 7/024 |
| | | | 416/1 |
| 2013/0121825 A1* | 5/2013 | Miranda | F03D 17/00 |
| | | | 416/61 |
| 2015/0275856 A1* | 10/2015 | Tahar | F03D 1/0691 |
| | | | 416/131 |
| 2017/0074743 A1* | 3/2017 | Baba | G01L 25/00 |
| 2017/0241404 A1* | 8/2017 | Kristoffersen | F03D 7/0224 |
| 2017/0292501 A1 | 10/2017 | Perley et al. | |
| 2017/0314525 A1* | 11/2017 | Futahashi | F03B 15/00 |
| 2019/0211805 A1* | 7/2019 | Elmose | F03D 17/00 |
| 2019/0345916 A1* | 11/2019 | Stephen | F03D 7/04 |
| 2021/0148336 A1* | 5/2021 | Brødsgaard | G01N 3/20 |

FOREIGN PATENT DOCUMENTS

| | | | | |
|---|---|---|---|---|
| CN | 102439301 A | 5/2012 | | |
| CN | 102648345 A | 8/2012 | | |
| CN | 102713263 A | 10/2012 | | |
| DE | 102010027229 A1 | 1/2012 | | |
| DE | 102014204017 A1 * | 9/2015 | ......... | F03D 7/0224 |
| EP | 2757256 A2 | 7/2014 | | |
| EP | 2770195 A2 | 8/2014 | | |
| WO | 2010016764 A1 | 2/2010 | | |
| WO | 2012083958 A2 | 6/2012 | | |
| WO | 2012146722 A2 | 11/2012 | | |
| WO | 2015132187 A1 | 9/2015 | | |
| WO | 2020125885 A1 | 6/2020 | | |

OTHER PUBLICATIONS

PCT, International Search Report for Application No. PCT/DK2019/050377 dated Mar. 26, 2020.

PCT, Written Opinion of the International Searching Authority for Application PCT/DK2019/050377 dated Mar. 26, 2020.

Danish Patent and Trademark Office, Search Opinion for Application No. PA 2018 70838 dated Jun. 24, 2019.

Danish Patent and Trademark Office, Search Report for Application No. PA 2018 70838 dated Jun. 24, 2019.

Danish Patent and Trademark Office, 1st Technical Examination for Patent Application PA 2018 70838 dated Jun. 26, 2019.

Chinese Patent Office, First Office Action for Chinese Patent Application No. 2024032202067050, dated Mar. 22, 2024.

\* cited by examiner

CORRECTING PITCH ANGLE

FIELD OF THE INVENTION

The present invention relates to a method of correcting a pitch angle of blades of a wind turbine.

BACKGROUND OF THE INVENTION

Modern wind turbines are typically of a variable-pitch design, where each blade of the turbine can be pitched to alter its respective angle of attack relative to the incoming wind. Pitch adjustment mechanisms of the blades are typically aligned in their zero pitch position by manual inspection during construction of the turbine. This can lead to a difference between the pitch angle reported by the blade, and the blade's aerodynamically true pitch. Such pitch angle deviation can reduce the power output of the wind turbine, and increase the loads experienced by the turbine.

Pitch deviation also creates a rotor imbalance, which can be detected. However, a rotor imbalance may also be caused by other factors, such as mass differences between the blades and ice on the blades. Conventional control systems are therefore not able to identify or correct for pitch deviation.

SUMMARY OF THE INVENTION

A first aspect of the invention provides a method of correcting a pitch angle deviation of a blade of a wind turbine, the wind turbine comprising a plurality of blades, the method comprising:
  providing first blade load measurements for each blade of the plurality of blades, the first blade load measurements measured when the wind turbine was operating in a first operational mode;
  determining calibration parameters to correct for differences between the first blade load measurements of the blades;
  providing second blade load measurements for each blade, the second measurements measured when the wind turbine was operating in a second operational mode, wherein a wind speed experienced by the wind turbine is lower during the first operational mode than during the second operational mode;
  applying the calibration parameters to the second blade load measurements to determine calibrated blade load measurements;
  identifying a difference between the calibrated blade load measurements of the blades;
  estimating a pitch angle deviation of at least one blade responsible for the identified difference; and
  altering a pitch angle of the at least one of the blades to correct for the pitch angle deviation.

In some embodiments of the method, identifying a difference between the calibrated blade load measurements may comprise: determining a target blade load; and identifying a difference between the calibrated blade load measurements of the at least one blade and the target blade load.

Estimating the pitch angle deviation may comprise estimating a pitch angle deviation for the at least one blade responsible for the difference between the calibrated blade load measurements of that blade and the target blade load.

In some embodiments, determining the target blade load may comprise determining an average of the calibrated blade load measurements.

In such embodiments, a pitch angle deviation may be estimated for each blade of the wind turbine, and a pitch angle of each of the blades may be adjusted to correct for the respective pitch angle deviation.

In some embodiments, determining the target blade load may comprises identifying a blade as a master blade; and setting the calibrated blade load measurements for the master blade as the target blade load.

In some embodiments, estimating the pitch angle deviation of the blades may comprise: modelling differences in blade load measurements expected for the blades for given pitch angle deviations of the blades; and comparing the modelled differences to the identified difference to estimate a pitch angle deviation of the at least one blade.

In some embodiments, estimating the pitch angle deviation of the blades may further comprise estimating from the comparison of the modelled differences to the identified difference a magnitude and/or direction of pitch angle adjustment needed to correct for the identified difference.

In some embodiments, altering a pitch angle of the at least one of the blades to correct for the pitch angle deviation may comprise incrementally altering the pitch angle of the at least one blade; and re-estimating a pitch angle deviation of the at least one blade.

In some embodiments, determining calibration parameters to correct for differences between the first blade load measurements of the blades comprises determining an average of the first blade load measurements; and determining respective calibration parameters for each blade to correct for a difference between the first blade load measurements of that blade and the average.

In some embodiments, determining calibration parameters to correct for differences between the first blade load measurements of the blades may comprises identifying one of the blades as a master blade; and determining respective calibration parameters for each of the other blades to correct for a difference between the first blade load measurements of the that blade and the first blade load measurements of the master blade.

In some embodiments, during the first operational mode the wind turbine may be operated at idle; and during the second operational mode the wind turbine may be operated at partial load or at full load.

In such embodiments, determining the calibration parameters may comprise binning the measurements of the first blade load measurements for each blade according to a rotation angle of the blade associated with the respective measurement. The rotation angle is the position of the blade in the rotor plane with respect to a predetermined zero position of the turbine blades.

In some embodiments, identifying a difference between the calibrated blade load measurements of the blades may comprise binning the calibrated blade load measurements for each blade according to a wind speed associated with each measurement.

In some such embodiments, identifying a difference between the calibrated blade load measurements of the blades may further comprise determining a relationship between wind speed and the difference between the calibrated blade load measurements of the at least one blade and the target blade load.

In some such embodiments, estimating the pitch angle deviation of the blades may comprise: modelling the relationship between wind speed and the difference for given pitch angle deviations of the at least one blade; and comparing the modelled relationship to the determined relationship to estimate a pitch angle deviation of the at least one blade.

In some embodiments, during the first operational mode the wind turbine may be operated at a partial load; and during the second operational mode the wind turbine may be operated at a full load.

In some such embodiments, determining the calibration parameters may comprise binning the measurements of the first blade load measurements for each blade according to a wind speed associated with the respective measurement.

In some embodiments, identifying a difference between the calibrated blade load measurements of the blades may comprise binning the calibrated blade load measurements for each blade according to a pitch angle associated with each measurement.

In such embodiments, identifying a difference between the calibrated blade load measurements of the blades further may comprise determining a relationship between pitch angle and the difference between the calibrated blade load measurements of the at least one blade and the target blade load.

In some such embodiments, the relationship between the pitch angle and the difference may be a rate of change of blade load as a function of pitch angle.

In some embodiments, estimating the pitch angle deviation of the blades may comprise:
modelling the relationship between pitch angle and the difference for given pitch angle deviations of the at least one blade; and
comparing the modelled relationship to the determined relationship to estimate a pitch angle deviation of the at least one blade.

A second aspect of the invention provides a wind turbine comprising:
a plurality of blades, each blade associated with a respective blade load sensor; and
a pitch adjustment mechanism configured to adjust the pitch of each of the blades; and
a control system configured to receive blade load measurements from the blade load sensors, and to control the pitch adjustment mechanism;
wherein the control system is configured to perform the method of any embodiment of the first aspect to correct a pitch angle deviation of at least one of the plurality of blades.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
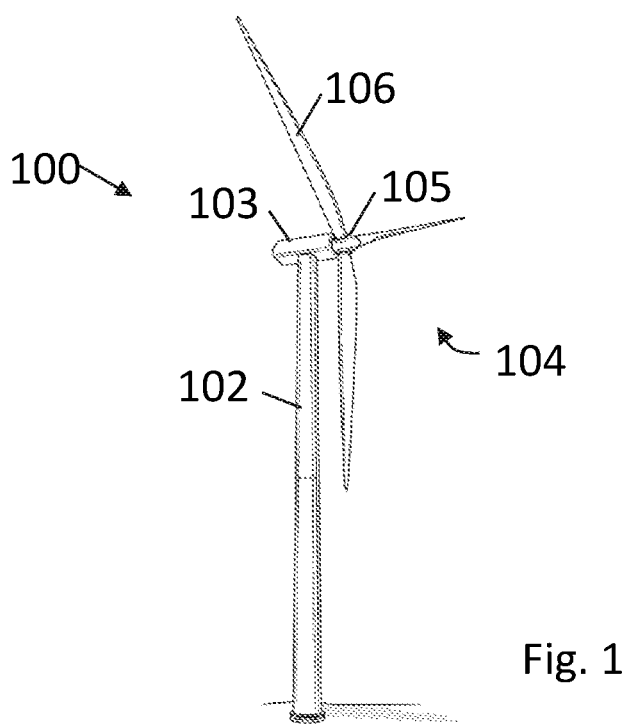
FIG. 1 is a schematic representation of a wind turbine.

FIG. 1 illustrates, in a schematic perspective view, an example of a wind turbine 100. The wind turbine 100 includes a tower 102, a nacelle 103 at the apex of the tower, and a rotor 104 operatively coupled to a generator housed inside the nacelle 103. In addition to the generator, the nacelle houses miscellaneous components required for converting wind energy into electrical energy and various components needed to operate, control, and optimize the performance of the wind turbine 100. The rotor 104 of the wind turbine includes a central hub 105 and a plurality of blades 106 that project outwardly from the central hub 105. In the illustrated embodiment, the rotor 104 includes three blades 106, but the number may vary. Moreover, the wind turbine comprises a control system. The control system may be placed inside the nacelle or distributed at a number of locations inside the turbine and communicatively connected.

The wind turbine 100 may be included among a collection of other wind turbines belonging to a wind power plant, also referred to as a wind farm or wind park, that serve as a power generating plant connected by transmission lines with a power grid. The power grid generally consists of a network of power stations, transmission circuits, and substations coupled by a network of transmission lines that transmit the power to loads in the form of end users and other customers of electrical utilities.

Figure 2:
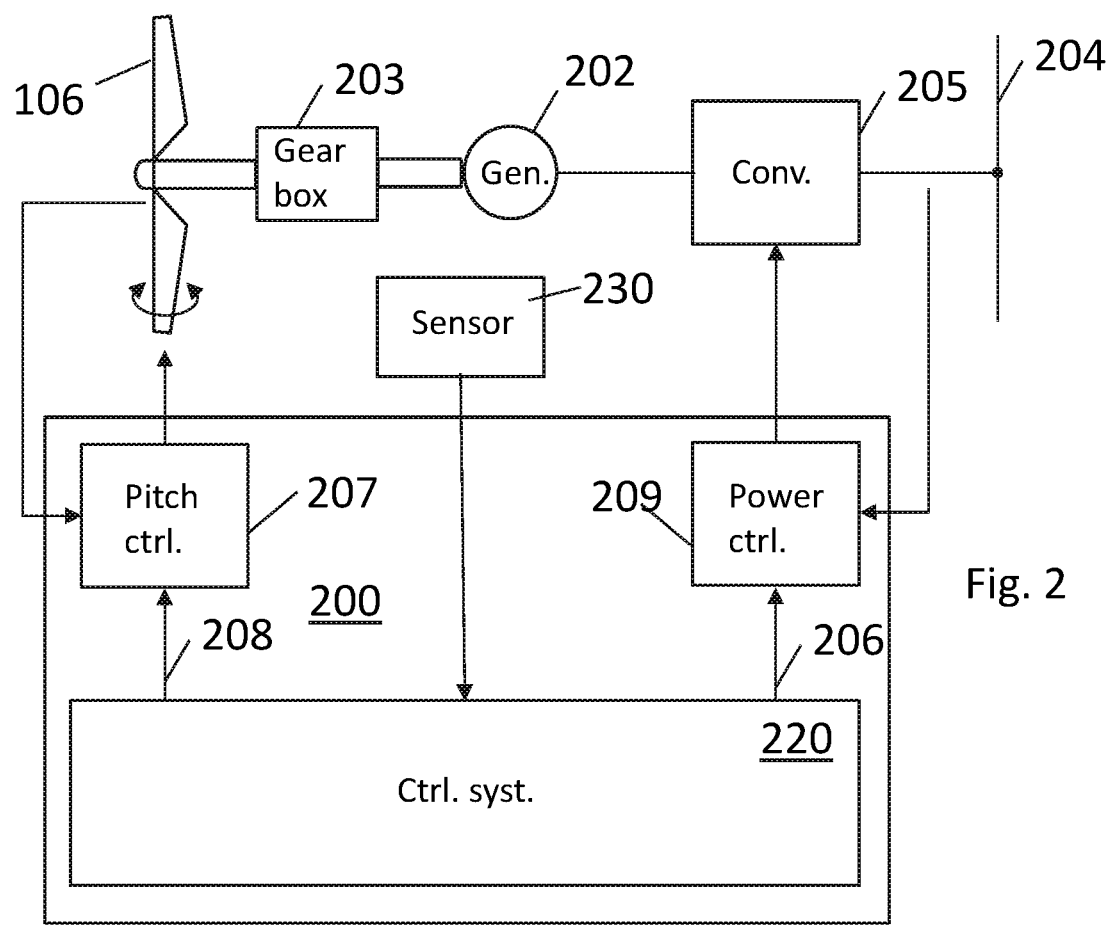
FIG. 2 is a schematic representation of a control system of the wind turbine.

FIG. 2 schematically illustrates an embodiment of a control system 200 together with elements of a wind turbine. The wind turbine comprises rotor blades 106 which are mechanically connected to an electrical generator 202 via gearbox 203. In direct drive systems, and other systems, the gearbox 203 may not be present. The electrical power generated by the generator 202 is injected into a power grid 204 via an electrical converter 205. The electrical generator 202 and the converter 205 may be based on a full scale converter (FSC) architecture or a doubly fed induction generator (DFIG) architecture, but other types may be used.

The control system 200 comprises a number of elements, including at least one main controller 220 with a processor and a memory, so that the processor is capable of executing computing tasks based on instructions stored in the memory. In general, the wind turbine controller ensures that in operation the wind turbine generates a requested power output level. This is obtained by adjusting the pitch angle of the blades 106 and/or the power extraction of the converter 205. To this end, the control system comprises a pitch system including a pitch controller 207 using a pitch reference 208, and a power system including a power controller 209 using a power reference 206. The wind turbine rotor comprises rotor blades that can be pitched by a pitch mechanism. The rotor comprises an individual pitch system which is capable of individual pitching of the rotor blades, and may comprise a common pitch system which adjusts all pitch angles on all rotor blades at the same time. The control system, or elements of the control system, may be placed in a power plant controller (not shown) so that the turbine may be operated based on externally provided instructions.

The control system 200 further comprises a number of sensors 230 (for clarity only one sensor is represented in FIG. 2). The sensors 230 measure the load on each blade 106. In particular, the sensors 230 may measure the root bending moment of each blade 106.

When the turbine 100 is initially constructed, the pitch of each blade 106 is manually aligned. This may result in a difference between the pitch angle that control system 200 reports for a blade 106 and the actual aerodynamic pitch of the blade. The control system 200 uses pitch to optimise performance of the turbine 100 for current wind conditions. Any mismatch between actual pitch and the reported pitch of a blade 106 may result in the turbine 100 performing sub-optimally, reducing the amount of energy than can be extracted from the wind.

Figure 3:
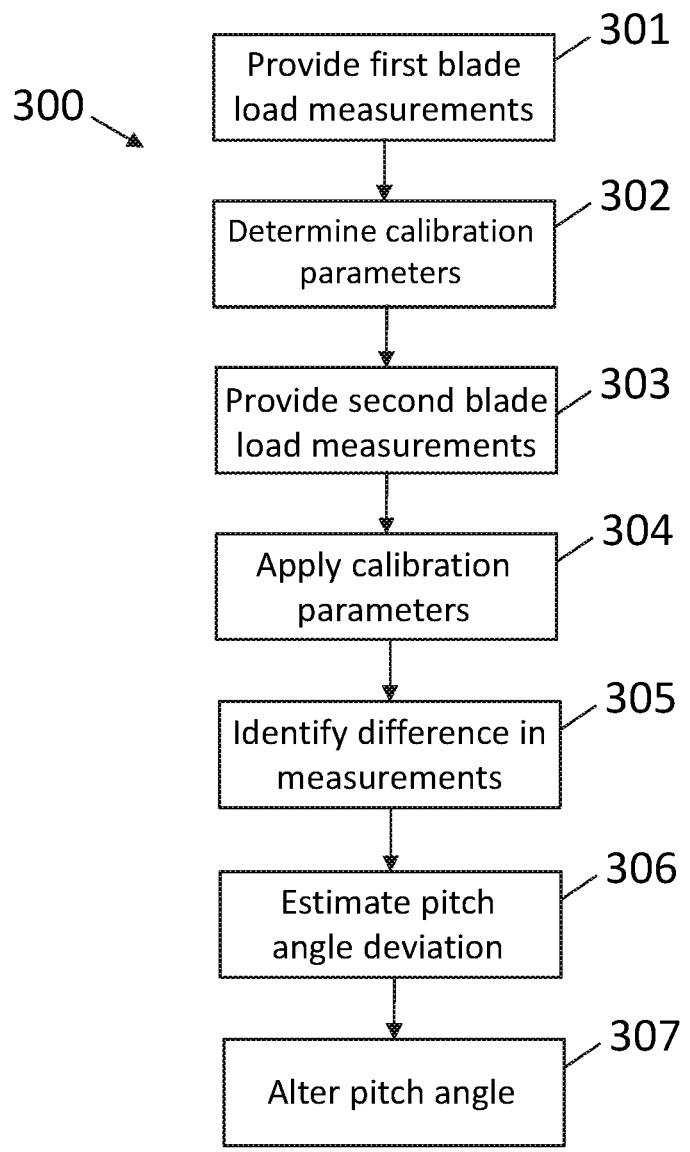
FIG. 3 illustrates a method of controlling the wind turbine to correct for a pitch angle deviation.

FIG. 3 illustrates a method 300 of correcting for deviations in pitch angle. Method 300 allows pitch deviations to be corrected automatically, whilst the turbine is in operation. It does not require manual re-inspection of the pitch position of the blades, and avoids the problems associated with pitch deviation detection by rotor imbalance.

At step 301, first blade load measurements for each blade 106 of the turbine 100 are provided. The first blade load measurements are measurements from when the wind turbine was operating in a first operational mode, such as idling or in a partial load region. The first blade load measurements may be recently measured, or may be provided from data storage. For example, the first blade load measurements may have been recorded during an initial start-up period of the turbine 100, and stored for later use. The first blade load measurements may be measurements of the root bending moment experienced by each blade 106.

At step 302, calibration parameters are determined to correct for differences between the first blade load measurements of the blades. This step ensures that observed blade load differences are not due to the different blade load sensors 230 themselves. For example, a gain multiplier and an offset value may be determined for the sensor 230 associated with each blade 106. The calibration parameters may be determined using an average (e.g. mean or median) of the first measurements, or by calibrating the first measurements against a predetermined master blade.

At step 303, second blade load measurements are provided for each blade. The second measurements were measured when the wind turbine was operating in a second operational mode. The second operational mode is a higher wind speed operational region of the wind turbine 100 than the first operational mode. For example, where the first operational mode is partial load operation, the second operational mode may be full load operation. The second blade load measurements may be provided from a data storage.

At step 304, the calibration parameters are applied to the second blade load measurements to determine calibrated blade load measurements. In particular, the calibration parameters for a sensor 320 associated with a blade 106 may be applied to the second blade load measurements for that blade. This step substantially removes systematic errors due to the sensors 320 themselves from the second blade load measurements. Any remaining difference between the calibrated blade load measurements of the blades is likely to be related to pitch angle differences.

At step 305, a difference between the calibrated blade load measurements of the blades 106 is identified. In particular, identifying a difference between the calibrated blade load measurements may comprise determining a target blade load, and identifying a difference between the calibrated blade load measurements of the at least one blade and the target blade load. The target blade load may for example be the mean of the calibrated blade load measurements, or may be the blade load experienced by a predetermined master blade. The target blade load may vary as a function of an operational condition of the wind turbine, for example as a function of wind speed or rotation angle. Comparing differences to a target blade load provides a common reference point for assessing differences between the blades.

At step 306, a pitch angle deviation of at least one blade 106 responsible for the identified difference is estimated. In embodiments where the difference in blade loads is identified relative to a target blade load, estimating the pitch angle deviation may particularly comprise estimating a pitch angle deviation for the at least one blade responsible for the difference between the calibrated blade load measurements of that blade and the target blade load.

At step 307, a pitch angle of the at least one of the blades 106 is altered to correct for the pitch angle deviation.

It is noted that steps 301-302, in which calibration parameters are determined, may be performed at a separate time to the remaining steps 303-307. For example, the calibration steps 301-301 may be performed during an initial commissioning period of a wind turbine 100. The pitch correction steps 303-307 may then be performed some time later, for example a period of months or years later.

The method 300 thus corrects for pitch angle deviations based on differences between the blades, rather than correcting each blade individually based on its absolute position. This may mean that an individually perfectly aligned blade is made to be slightly misaligned by the method. However, it has been realised that by correcting for observed differences between the blades, the total energy output of the turbine can be increased, even if an individual blade becomes misaligned.

Figure 4:
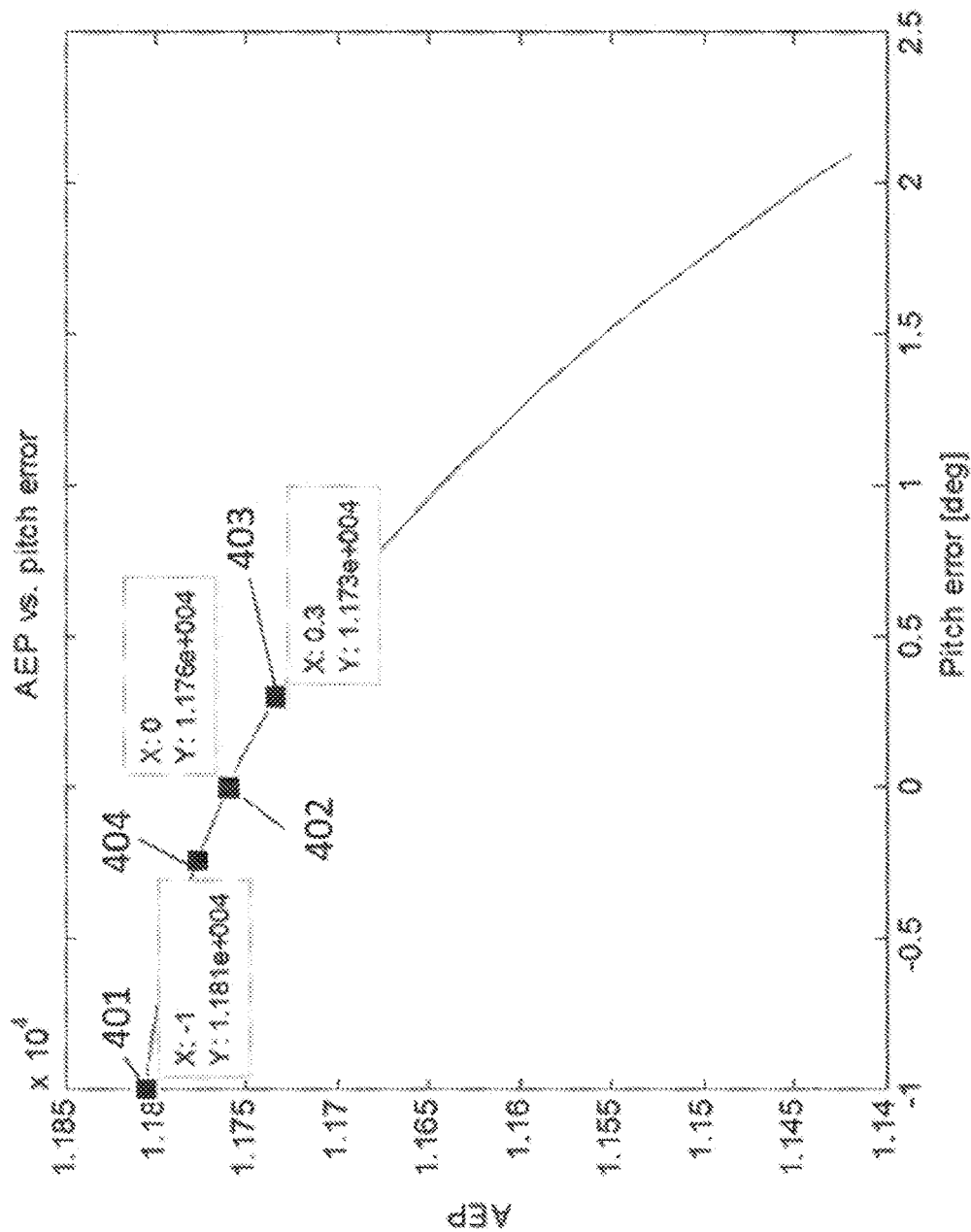
FIG. 4 illustrates the increase in energy production that can be achieved using the method illustrated in FIG. 3.

The increase in total energy production made possible by method 300 is illustrated in FIG. 4. FIG. 4 shows a typical annual energy production (AEP [MWh]) for a given wind turbine type 100 as a function of pitch error (for each blade). Points 401-403 show initial pitch errors for the blades 106 of the turbine 100. Two of the blades are misaligned (by −1° and 0.3° respectively), as shown by points 401 and 403. The blade represented by point 402 is initially perfectly aligned.

In the particular embodiment of method 300 performed on the blades 106 represented in FIG. 4, each blade is adjusted to correct for a difference between its calibrated blade load and the average calibrated blade load (i.e. the target blade load is the average blade load). The average may be a median or mean of the calibrated blade loads. As a result of this correction, the pitch of every blade 106 is adjusted, including the initially perfectly aligned blade represented by point 402. The new pitch error of each blade is represented by point 404 in FIG. 4. From this, it can be seen that the total energy produced by the three blades together is increased by adjusting to the average.

In alternative embodiments, instead of correcting each blade to the average, one of the blades 106 may be identified as a master blade. The calibrated blade load of the master blade is then used as the target blade load. The pitch of each of the remaining blades 106 is adjusted to eliminate differences between calibrated blade loads of those blades and those of the master blade. For example, a first blade 106 may be assumed to be correctly aligned, and so is identified as the master blade. The other blades 106 of the turbine 100 are then corrected to match the master blade. This may allow a fast initial calibration of the pitches of the blades 106 of the turbine 100. Extra care may be taken when initially aligning the master blade, to ensure that the other blades are corrected to match a well-aligned blade.

The step 306 of estimating the pitch angle deviation of the blades in method 300 may comprise modelling differences in blade load measurements expected for the blades for given pitch angle deviations of the blades, and comparing the modelled differences to the identified difference to estimate a pitch angle deviation of the at least one blade. For example, expected blade load differences may be modelled for pitch angle deviations in 0.5° increments or in 1° increments. For example, expected blade load differences may be modelled for pitch angle deviations of −2°, −1°, 0°, 1°, and 2°. Comparing the modelled differences to the identified difference may then comprise selecting a modelled difference that is closest to the identified difference (or closest in behaviour to the identified difference), and adjusting the pitch angle based on the given pitch angle for the selected modelled difference.

The model may for example relate operational conditions of the turbine to predicted blade load for that blade. The model may comprise a look-up table. For example, the model may be a thrust coefficient ($C_t$) table for the turbine 100, relating the thrust coefficient to pitch and tip speed ratio. Tip speed ratio is the ratio of the tangential speed of a blade tip to the wind speed.

In some embodiments, the step 306 of estimating the pitch angle deviation of the blades 106 may further comprise estimating from the comparison of the modelled differences to the identified difference a magnitude and/or direction of pitch angle adjustment needed to correct for the identified difference. In other words, it is not necessary to extract a precise value for the pitch deviation. Instead, a direction and/or magnitude of the correction needed can be estimated from the modelled differences, and then the pitch of the one or more blades 106 can be adjusted based on that estimation. The correction steps 302-307 of the method 300 can then be re-performed to test if the adjustment has reduced the pitch angle deviation.

To minimise the possibility of adjusting the pitch of the blades in such a way that power production is reduced, the pitch angles may be adjusted incrementally, such as in steps of between 0.5° and 1°, or between 0.2° and 0.5°. After an incremental adjustment, the correction steps 302-306 of method 300 can be performed again using new second measurements to see if the incremental adjustment improved or worsened the pitch angle deviation of the blades 106. If the pitch angle deviation has reduced, the step 307 can be performed again, adjusting the pitch angle of at least one blade by a further increment. If the pitch angle deviation has increased, the pitch of the blades can be reset to their initial position. These method steps may be repeated until there is no pitch deviation between the blades, or until the estimated blade load deviation is less than 0.5° or less than 0.2°. The size of the increment used may be reduced as the pitch angle deviation is incrementally reduced. Alternatively, the increment may be implemented as a proportion (or gain) of the estimated pitch angle deviation. For example, the proportion may be between 0.3 and 0.8. The adjusted pitch positions of the blades may be maintained for a trial period, during which time the energy output of the turbine 100 can be assessed. If the output has reduced, the pitch positions of the blades may be reset to their original positions.

FIGS. 5-8 illustrate specific implementations of the method 300.

FIGS. 5 and 6 illustrate the calibration steps and correction steps respectively of a particular embodiment of method 300. In this embodiment, the first measurements were taken when the turbine was idling (e.g. the wind speed was below 4 m/s). The second measurements were taken when the turbine was at partial load (e.g. wind speeds between 5 and 9 m/s)

Figure 5A:
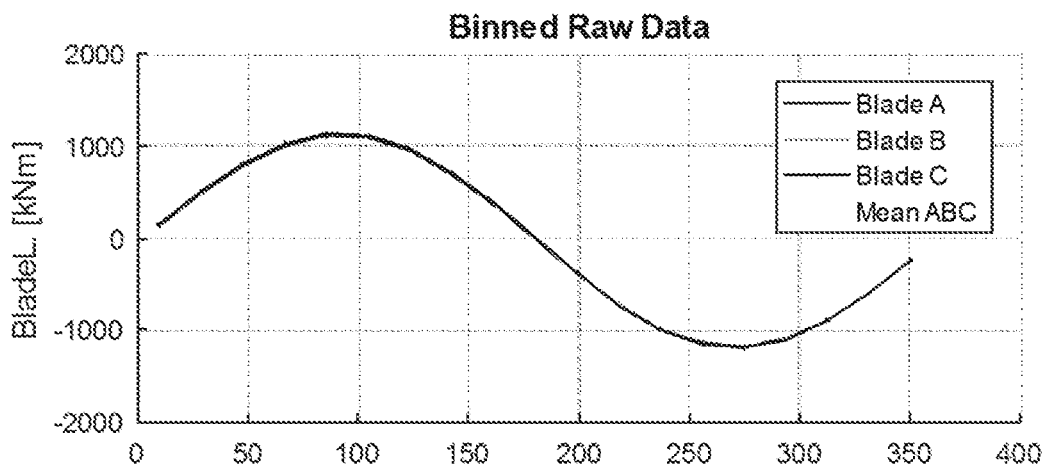
FIGS. 5a-d illustrate the calibration steps of one embodiment of the method.

FIG. 5a shows the blade loads experienced by each blade 106 as the blades rotated in the rotor plane during idling operation, plotted against the angular position of the blade in the rotor plane at the time of the measurement (i.e. the blade's azimuthal position). When idling, the loads experienced by the blades are predominantly due to gravitational forces. This produces a cyclic variation in blade load, as can be seen in FIG. 5a. As each blade has approximately the same mass, each blade should experience the approximately the same load variation. Any differences between the measured blade loads are likely to be due to systemic errors in the sensors 230 measuring the blade loads.

Figure 5B:
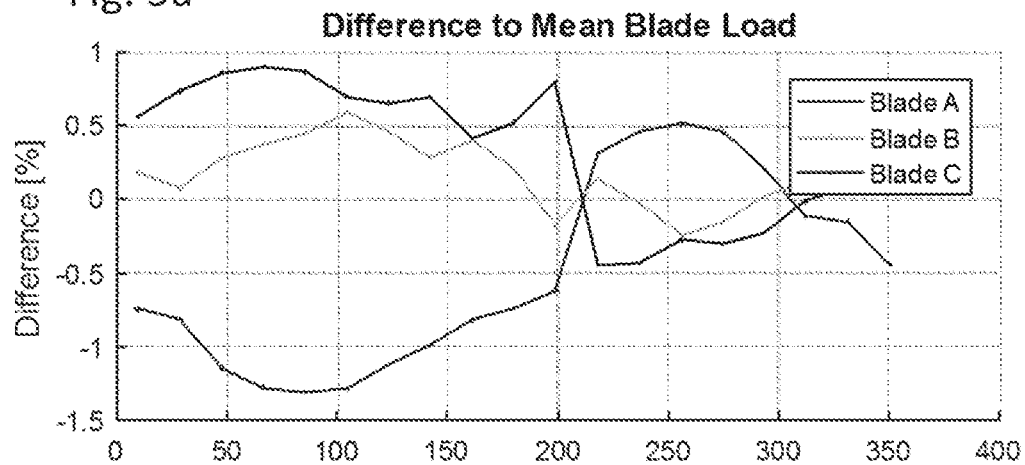

To determine the differences between measured blade loads, the measurements are averaged, and the differences between the measurements for each blade and the average are determined. FIG. 5b shows the difference to the average (in this case the mean) for the blades of FIG. 5a. Calibration parameters are then determined for each blade. In particular, a gain value $G_x$ and an offset value $O_x$ are calculated for each blade x (where x can be the blade A, blade B, or blade C indicated in the FIG. 5a) to substantially eliminate the difference from the mean for that blade.

Calibrated blade load measurements $BladeLoadx_{Calibrated}$ for a blade x may then be calculated from the raw blade load measurement BladeLoadx measured by the respective sensor 230 using:

$$BladeLoadx_{Calibrated} = BladeLoadx \times G_x + O_x$$

In this embodiment, the average is determined as a function of angular position in the rotor plane. In alternative examples, the average peak-to-peak blade load value may be determined, and the calibration parameters produced based on differences between the individual peak-to-peak loads and average peak-to-peak value.

Figure 5C:
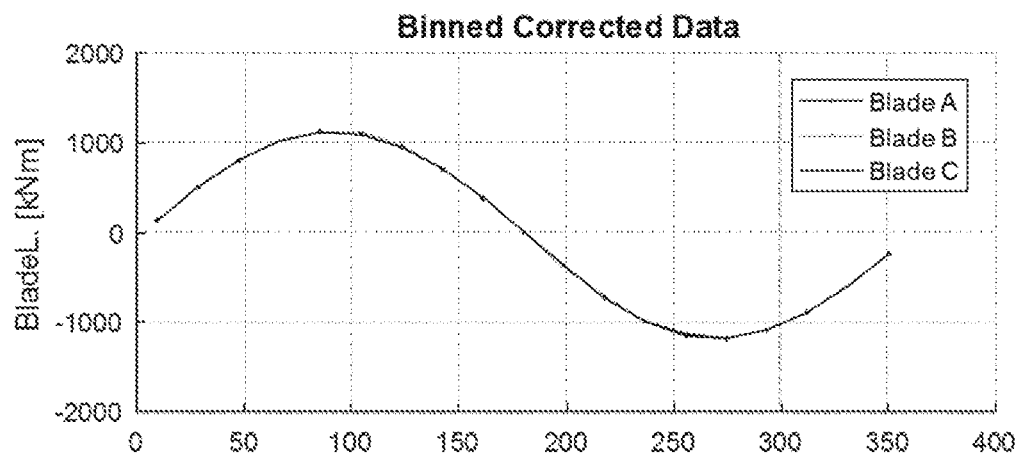
Figure 5D:
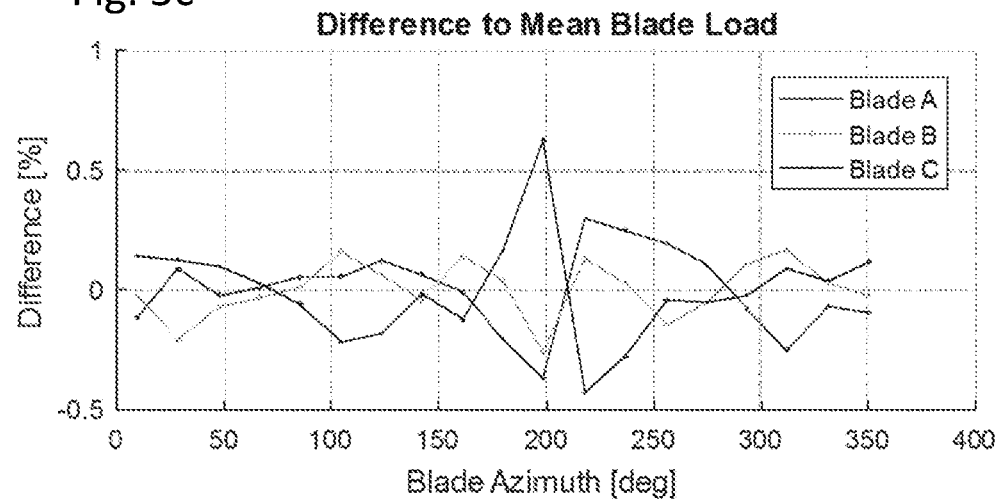

To illustrate the effect of the calibration parameters, FIG. 5c shows the measurements of FIG. 5a when the respective calibration parameters are applied. FIG. 5d shows the difference from these calibrated measurements to their mean. Comparing FIG. 5d to FIG. 5b, it is apparent that the calibration parameters have greatly reduced the differences between individual blade loads and the mean blade load across for all rotor angles.

Having determined calibration parameters for each blade in the idling region, the method now proceeds to correcting pitch angle deviation using measurements from the partial load region.

Figure 6A:
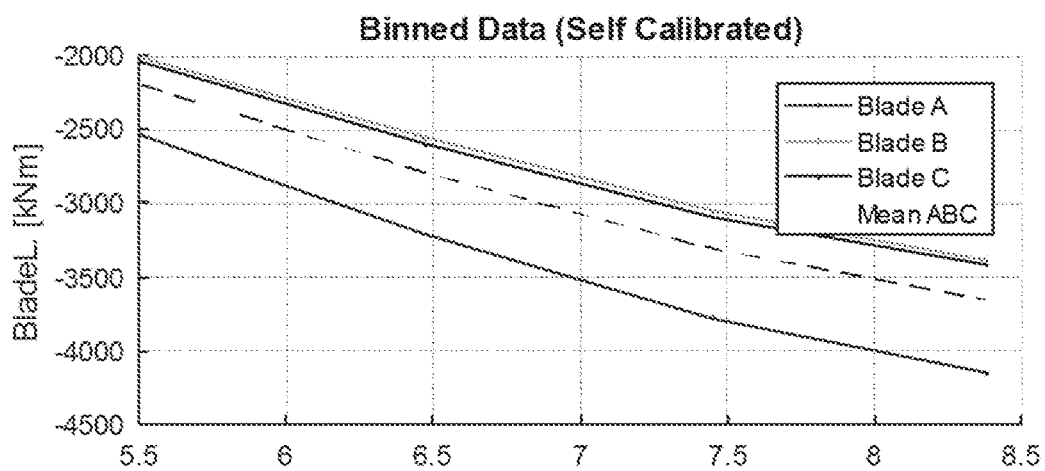
FIGS. 6a-d illustrate the pitch correction steps of that embodiment.

FIG. 6a shows the blade load experienced by each of the blades 106, plotted against the wind speed experienced by the turbine 100 when the respective measurement was taken. The calibration parameters have already been applied to the measurements in FIG. 6a. The visible difference between the blade loads experienced by the different blades is likely to be due to pitch angle deviation.

Figure 6B:
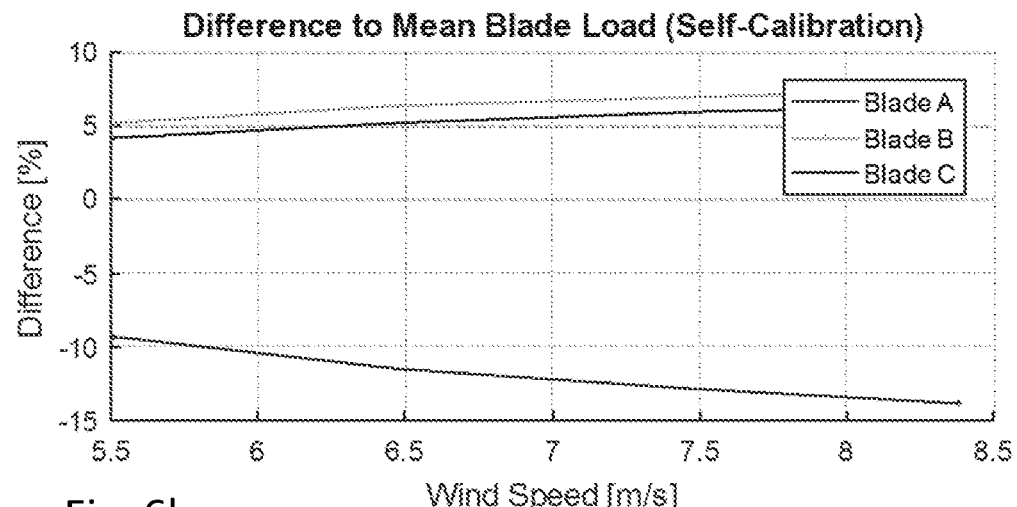

In this embodiment, the pitch of each blade is corrected based on the mean blade load, as discussed in relation to FIG. 4. To that end, the difference between each calibrated blade load and the mean blade load, as a function of wind speed, is determined. The resulting differences are shown in FIG. 6b.

The method then proceeds to estimate a pitch angle deviation that would cause the difference between each calibrated blade load and the average, using a model that relates operational parameters to pitch and blade load. For example, a thrust coefficient table may be used.

Figure 6C:
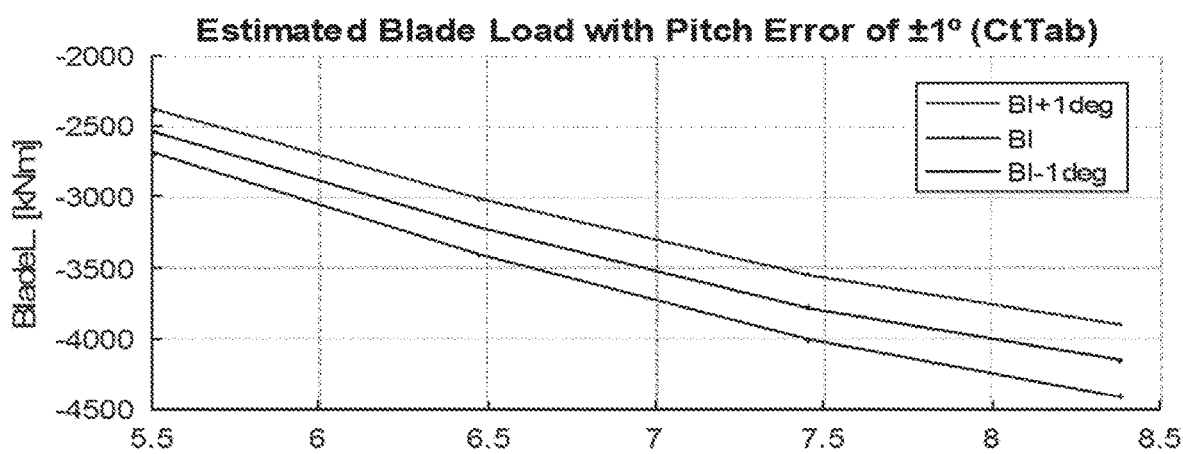

FIG. 6c shows the estimated blade load experienced by a blade 106 as a function of wind speed for pitch errors of 1°, 0°, and −1°. The blade loads for further given pitch error values may also be calculated, but have not been shown in FIG. 6c for clarity. For example blade loads may be calculated for pitch errors in 0.5° increments or 1° increments in the range −5° to 5° or −2° to 2°.

Figure 6D:
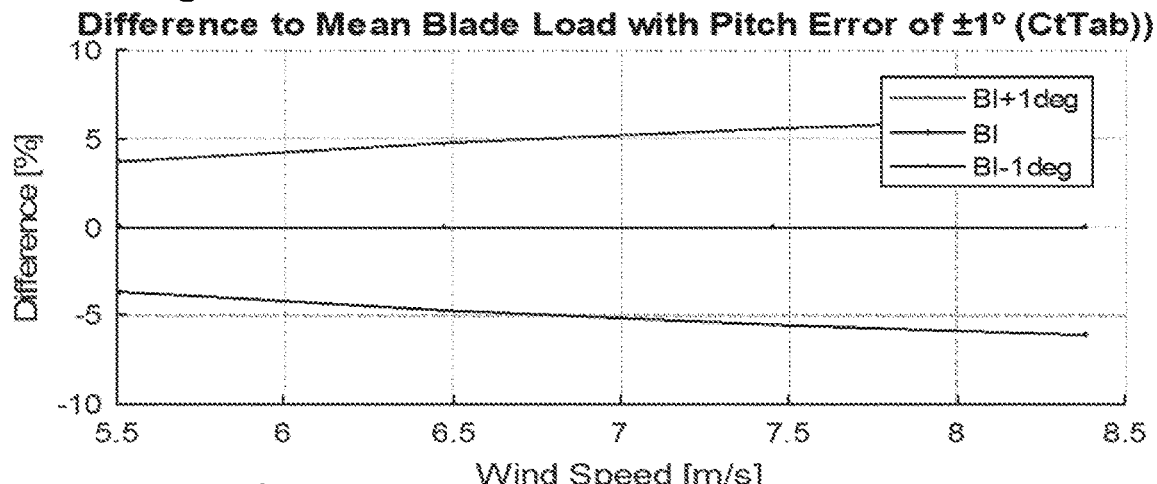

FIG. 6d shows the difference between the estimated blade loads of FIG. 6c and a modelled blade load for a blade with no pitch error. As can be seen, different pitch errors yield blade loads which behave differently as a function of wind speed. In particular, the gradient of the difference as a function of wind speed is positive for a pitch error of +1°, and negative for a pitch error of −1°. The absolute difference value for both 1° and −1° is approximately 5%.

The modelled differences can be compared to the differences of the calibrated measurements shown in FIG. 6b to estimate actual pitch error of the blades. For example, the absolute value of the difference, and the gradient of the difference may be compared. For example, two of the blades in FIG. 6b have differences around 5% and positive gradients. It may therefore be estimated that the pitch error of these blades is around +1°. The remaining blade has a difference with an absolute value of around 10%, and a negative gradient. Assuming a roughly linear link between blade load and pitch error, it can be estimated that the pitch error of this blade is approximately −2°. The pitch of each blade can then be adjusted to correct for its respective estimated pitch error.

In the example above, the pitch angles were estimated specifically using absolute values of the difference between the calibrated blade loads and the mean; and the gradient of the difference with respect to wind speed. In general, however, the step 305 of identifying a difference between the calibrated blade load measurements may comprise determining any relationship between wind speed and the difference between the calibrated blade load measurements of the blades and the target/mean blade load. The step 306 of estimating the pitch angle deviation of the blades may the comprise modelling that relationship between wind speed and the difference for given pitch angle deviations of the at least one blade, and comparing the modelled relationship to the determined relationship to estimate a pitch angle deviation of the at least one blade. The relationship may for example be an approximate relationship, or a slope of a line of best fit of the binned measurements. The relationship may be determined across a sub-section of measured wind speeds.

In order to provide accurate values of blade load, the measurements for each blade may be repeated a number of times. For example, measurements may be taken over a predetermined number of days (e.g. between 3-5 days), or for as long as the turbine is maintained the required operational region for those measurements. The first/second measurements may comprise all recorded measurements, binned against rotor position/wind speed; or may comprise average values of blade loads at particular rotor positions/wind speeds.

The embodiment illustrated in FIGS. 5 and 6 uses an idling period to calibrate the blade load measurements. This method may be particularly useful during the initial start-up of a turbine 100, when re-starting the turbine after a shut-down, or when there is a period of very low wind. However, some turbines, especially offshore turbines, may only be operated in an idling period very infrequently. FIGS. 7 and 8 illustrate an alternative embodiment of the method 300, which does not require the turbine to idle.

FIGS. 7 and 8 illustrate the calibration steps and correction steps respectively of the alternative embodiment of method 300. In this embodiment, the first measurements were taken when the turbine was at partial load (e.g. the wind speed between 5 m/s and 9 m/s—when the turbine 100 is operated with fixed pitch angle). The second measurements were taken when the turbine was at full load (e.g. wind speeds above 12 m/s—when the turbine 100 is operated with fixed rotor speed). A full load is where the turbine is operated at its rated power. A partial load is generating electricity, but is operating below the rated power. Measurements taken when wind speeds are between 9 m/s and 12 m/s are preferably not used, as this is a transition region between speed-controlled operation and pitch-controlled operation.

Figure 7A:
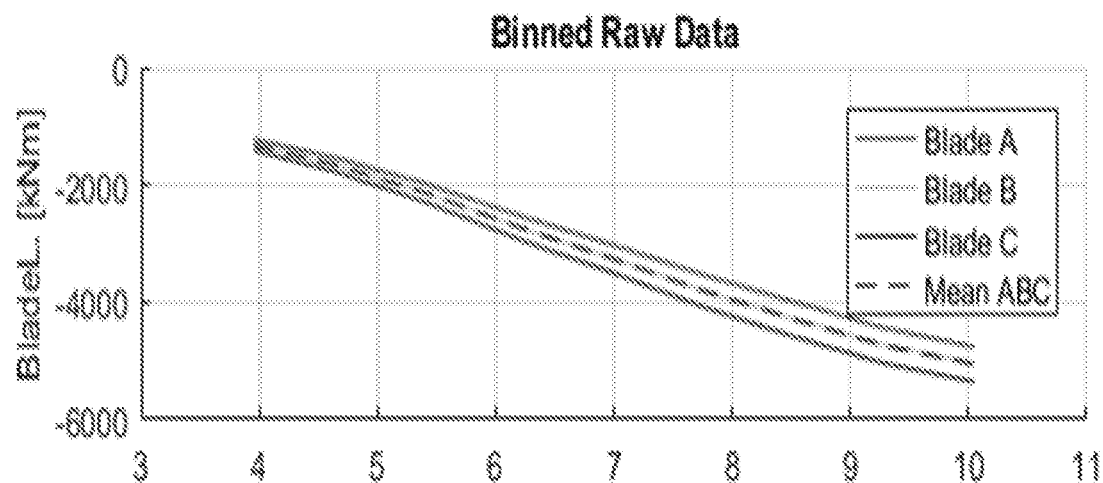
FIGS. 7a-b illustrate the calibration steps of a further embodiment of the method.

FIG. 7a shows first measurements of the blade loads for each blade 106 (labelled as blade A, blade B, and blade C respectively in the figures), measured during the partial load operation. The blade loads are binned as a function of wind speed at the time of the measurements. As described above in relation to FIGS. 5 and 6, the blade loads may be taken over a prolonged period, and either all the measurements binned against wind speed, or averages blade loads found for particular wind speed values.

Figure 7B:
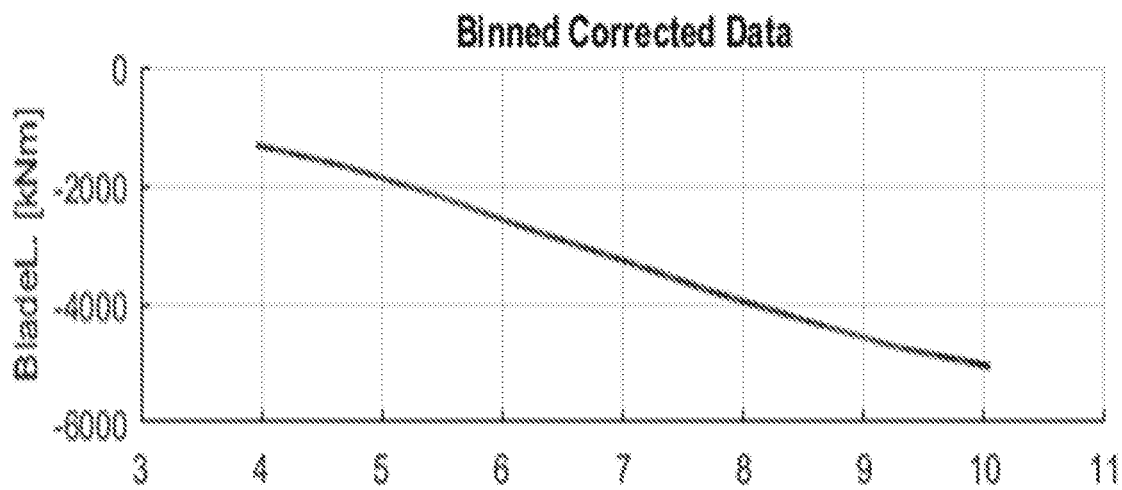

The measurements are calibrated by finding calibration parameters which eliminate differences between the first measurements of each blade and the mean of the first measurements, similarly to the process described above in relation to FIG. 5. FIG. 7b shows the measurements of FIG. 7a, with the calibration parameters applied. As can be seen, the differences between blade loads in the raw data have been removed by the calibration parameters.

Having determined the calibration parameters, the method proceeds to correct pitch errors based on blade load differences observed in the second operational mode, i.e. full load operation.

Figure 8A:
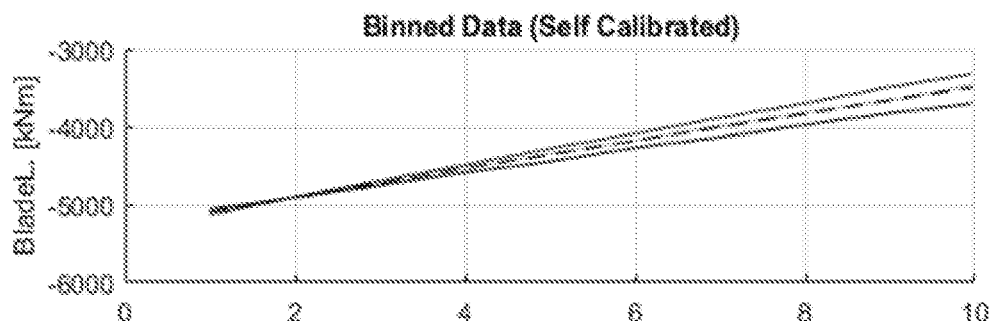
FIGS. 8a-c illustrate the pitch correction steps of that further embodiment.

FIG. 8a shows blade load measurements for each blade 106 in the second operational mode, with the calibration parameters already applied. In full load operation, pitch control is used to maintain the power output of the turbine 100. The blade loads of each blade 106 are therefore plotted as a function of pitch angle of that blade at the time the measurements were taken. In alternative embodiments, blade loads may alternatively be binned as a function of wind speed, but using pitch instead of wind speed may provide more accurate results.

Figure 8B:
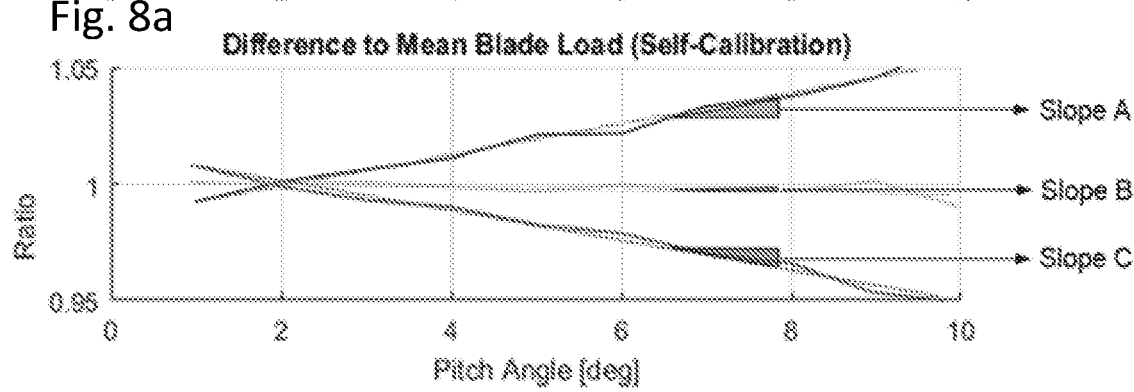

As the measurements shown in FIG. 8a have been calibrated, it is likely that the differences between the loads of each blade are caused by pitch errors. FIG. 8b shows the difference between the calibrated blade load for each blade, and the mean blade load, as a function of pitch angle. In this case, the difference is a ratio of individual blade load to mean blade load for each blade.

As described previously, the pitch error for each blade can be estimated by comparing the observed difference to the mean with a modelled difference. In particular, blade loads may be modelled using coefficient of thrust, $C_t$ tables which relate pitch angle and tip speed ratio to blade load. Such a model is used to determine blade loads for given values of pitch error. The coefficient of thrust determined from the $C_t$ tables may itself be used in the method as a proxy to the estimated blade load. Alternatively, the estimated blade loads may be derived from the coefficient of thrust. Deriving the blade loads may provide more accurate results.

Figure 8C:
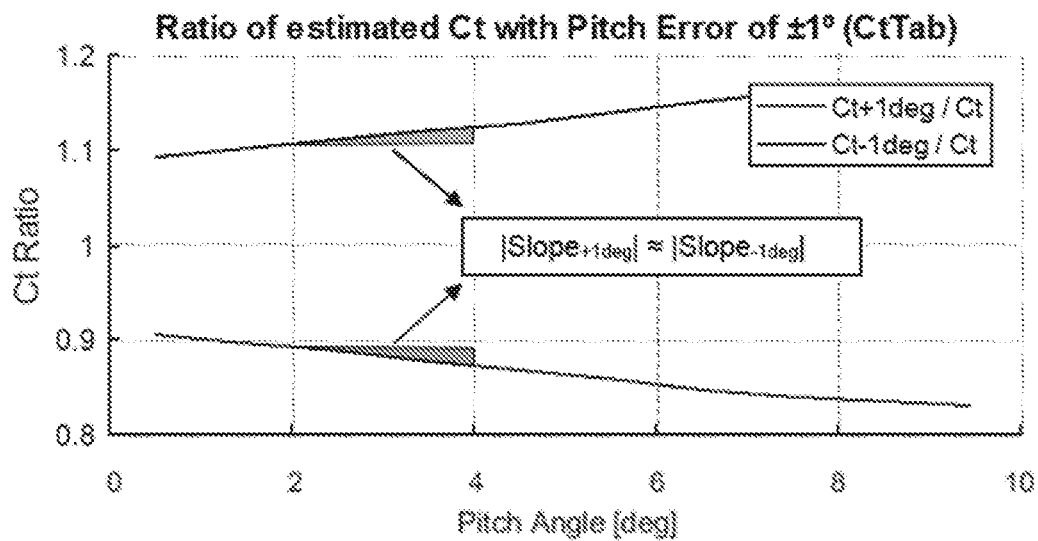

FIG. 8c shows the $C_t$ ratio (i.e. the modelled coefficient of thrust for the particular pitch error value, divided by a modelled coefficient of thrust for a blade with zero pitch error,) for pitch errors of +1° and −1°. Modelled $C_t$ ratios may also be determined for other pitch error values, but have not been shown in FIG. 8b for clarity. For example blade loads/$C_t$ values may be calculated for pitch errors in 0.5° increments or 1° increments in the range −3° to 3° or −2° to 2°. In this example, $C_t$ is used as a proxy to the estimated blade loads, as mentioned above, but in other examples blade loads may be derived from the $C_t$ values, and modelled blade load ratios used in place of the $C_t$ ratio.

The pitch deviation of each blade is determined by comparing the measured difference (i.e. those shown in FIG. 8b) to the modelled blade load/$C_t$ ratios. The modelled blade load ratio that most closely matches the measured difference for a blade is identified, and the pitch error that produce that modelled ratio is taken as the pitch error of that blade. In particular, the gradient of the modelled ratios as a function of pitch angle may be compared to that of the measured differences. Alternatively, the gradient of the modelled ratios as a function of pitch angle may be determined, as shown in FIG. 8c. It may then be assumed that the magnitude of the gradient scales linearly with pitch error. By comparing the magnitude of the gradient of the measured differences to the magnitude of the modelled gradient, a value of the pitch error may be determined. The direction of the pitch error (i.e. + or −) may be determined from the direction of the gradient. For example, if the measured gradient is 0.7× the modelled gradient, the pitch error can be assumed to be 0.7× the modelled pitch error value.

Once the pitch errors have been identified, the pitch of each blade 106 is adjusted to correct for it respective pitch error. As described above, the pitch of the blades may be adjusted incrementally, so that the performance of the turbine in the new pitch arrangement can be assessed before further adjusting the pitch of the blades.

Although the invention has been described above with reference to one or more preferred embodiments, it will be appreciated that various changes or modifications may be made without departing from the scope of the invention as defined in the appended claims.

The invention claimed is:

1. A method of correcting a pitch angle deviation of a blade of a wind turbine, the wind turbine comprising a plurality of blades, the method comprising:
providing first blade load measurements for each blade of the plurality of blades, wherein the first blade load measurements are measured during operation of the wind turbine in a first operational mode;
determining calibration parameters to correct for differences between the first blade load measurements of each blade;
providing second blade load measurements for each blade of the plurality of blades, wherein the second blade load measurements are measured during operation of the wind turbine in a second operational mode, wherein a wind speed experienced by the wind turbine is lower during the first operational mode than during the second operational mode;
applying the calibration parameters to the second blade load measurements to determine calibrated blade load measurements;
identifying a difference between the calibrated blade load measurements of each blade, and wherein identifying the difference between the calibrated blade load measurements comprises:
  determining a target blade load by determining an average of the calibrated blade load measurements from each blade of the plurality of blades; and
  identifying a difference between the calibrated blade load measurements of at least one blade and the target blade load;
estimating the pitch angle deviation of the at least one blade of the plurality of blades responsible for the identified difference, and wherein estimating the pitch angle deviation comprises estimating the pitch angle deviation for the at least one blade responsible for the difference between the calibrated blade load measurements of the at least one blade responsible and the target blade load; and
altering a pitch angle of the at least one blade to correct for the pitch angle deviation, wherein in altering the pitch angle of the at least one blade to correct for the pitch angle deviation, the plurality of blades are made to have a substantially same pitch error and one or more blades of the at least one blade become misaligned or further misaligned with respect to a pitch error of zero degrees after the altering of the pitch angle of the at least one blade, and
wherein identifying the difference between the calibrated blade load measurements of each blade comprises binning the calibrated blade load measurements for each blade according to a wind speed or pitch angle associated with each measurement.

2. The method of claim 1, wherein the pitch angle deviation is estimated for each blade of the wind turbine, and wherein the pitch angle of each of the blades is adjusted to correct for the respective pitch angle deviation.

3. The method of claim 1, wherein determining the target blade load comprises:
identifying a blade of the plurality of blades as a master blade; and
setting the calibrated blade load measurements for the master blade as the target blade load.

4. The method of claim 1, wherein estimating the pitch angle deviation of the at least one blade comprises:
modelling differences in blade load measurements expected for the at least one blade for given pitch angle deviations of the at least one blade; and
comparing the modelled differences to the identified difference to estimate the pitch angle deviation of the at least one blade.

5. The method of claim 4, wherein estimating the pitch angle deviation of the at least one blade further comprises:
estimating from the comparison of the modelled differences to the identified difference at least one of a magnitude or a direction of pitch angle adjustment needed to correct for the identified difference.

6. The method of claim 1, wherein altering a pitch angle of the at least one blade to correct for the pitch angle deviation comprises:
incrementally altering the pitch angle of the at least one blade; and
re-estimating a pitch angle deviation of the at least one blade.

7. The method of claim 6, wherein in incrementally altering the pitch angle of the at least one blade, a size of an increment used to alter the pitch angle of the at least one blade is incrementally reduced.

8. The method of claim 6, wherein in incrementally altering the pitch angle of the at least one blade, a size of an increment used to alter the pitch angle of the at least one blade is implemented as a proportion of the estimated pitch angle deviation.

9. The method of claim 1, wherein:
during the first operational mode the wind turbine is operated at idle; and
during the second operational mode the wind turbine is operated at partial load or at full load.

10. The method of claim 1, wherein determining the calibration parameters comprises binning the measurements of the first blade load measurements for each blade according to a rotation angle of the blade associated with the respective measurement.

11. The method of claim 1, wherein:
during the first operational mode the wind turbine is operated at a partial load; and
during the second operational mode the wind turbine is operated at a full load.

12. The method of claim 11, wherein determining the calibration parameters comprises binning the measurements of the first blade load measurements for each blade according to a wind speed associated with the respective measurement.

13. The method of claim 1, wherein the average is determined as a function of angular position in a rotor plane.

14. The method of claim 1, wherein in altering the pitch angle of the at least one blade to correct for the pitch angle deviation so the plurality of blades are made to have the substantially same pitch error, a total power output of the wind turbine is increased.

15. A wind turbine, comprising:
a plurality of blades, each blade of the plurality of blades associated with a respective blade load sensor;
a pitch adjustment mechanism configured to adjust a pitch of each blade of the plurality of blades; and
a control system configured to receive blade load measurements from the blade load sensors, and to control the pitch adjustment mechanism;
wherein the control system comprises a processor configured to perform an operation to correct a pitch angle deviation of at least one of the plurality of blades, the operation, comprising:
providing first blade load measurements for each blade of the plurality of blades, wherein the first blade load measurements are measured during operation of the wind turbine in a first operational mode;
determining calibration parameters to correct for differences between the first blade load measurements of each blade of the plurality of blades;
providing second blade load measurements for each blade of the plurality of blades, wherein the second blade load measurements are measured during operation of the wind turbine in a second operational mode, wherein a wind speed experienced by the wind turbine is lower during the first operational mode than during the second operational mode;
applying the calibration parameters to the second blade load measurements to determine calibrated blade load measurements;
identifying a difference between the calibrated blade load measurements of each blade of the plurality of blades, and wherein identifying the difference between the calibrated blade load measurements comprises:
determining a target blade load by determining an average of the calibrated blade load measurements from each blade of the plurality of blades; and
identifying a difference between the calibrated blade load measurements of at least one blade and the target blade load;
estimating the pitch angle deviation of the at least one blade responsible for the identified difference, and wherein estimating the pitch angle deviation comprises estimating the pitch angle deviation for the at least one blade responsible for the difference between the calibrated blade load measurements of the at least one blade responsible and the target blade load; and
altering a pitch angle of the at least one blade to correct for the pitch angle deviation, wherein in altering the pitch angle of the at least one blade to correct for the pitch angle deviation, the plurality of blades are made to have a substantially same pitch error and one or more blades of the at least one blade become misaligned or further misaligned with respect to a pitch error of zero degrees after the altering of the pitch angle of the at least one blade.

16. The wind turbine of claim 15, wherein the pitch angle deviation is estimated for each blade of the plurality of blades of the wind turbine, and wherein a pitch angle of each blade of the plurality of blades is adjusted to correct for the respective pitch angle deviation.

17. A controller, comprising:
a processor; and
a memory, the processor is capable of executing computing tasks based on instructions stored in the memory, the computing tasks comprising:
providing first blade load measurements for each blade of a plurality of blades of a wind turbine, wherein the first blade load measurements are measured during operation of the wind turbine in a first operational mode;
determining calibration parameters to correct for differences between the first blade load measurements;
providing second blade load measurements for each blade of the plurality of blades, wherein the second blade load measurements are measured during operation of the wind turbine in a second operational mode, wherein a wind speed experienced by the wind turbine is lower during the first operational mode than during the second operational mode;
applying the calibration parameters to the second blade load measurements to determine calibrated blade load measurements;
identifying a difference between the calibrated blade load measurements of the plurality of blades, and wherein identifying the difference between the calibrated blade load measurements comprises:
determining a target blade load by determining an average of the calibrated blade load measurements from each blade of the plurality of blades; and
identifying a difference between the calibrated blade load measurements of at least one blade and the target blade load;
estimating a pitch angle deviation of the at least one blade of the plurality of blades responsible for the identified difference, and wherein estimating the pitch angle deviation comprises estimating the pitch angle deviation for the at least one blade responsible for the difference between the calibrated blade load measurements of the at least one blade responsible and the target blade load; and
altering a pitch angle of the at least one blade to correct for the pitch angle deviation, wherein in altering the pitch angle of the at least one blade to correct for the pitch angle deviation, the plurality of blades are made to have a substantially same pitch error and one or more blades of the at least one blade become misaligned or further misaligned with respect to a pitch error of zero degrees after the altering of the pitch angle of the at least one blade, and
wherein identifying the difference between the calibrated blade load measurements comprises binning the calibrated blade load measurements for each blade of the plurality of blades according to a wind speed or pitch angle associated with each measurement.

* * * * *